(12) United States Patent
Kuc et al.

(10) Patent No.: US 8,428,073 B1
(45) Date of Patent: Apr. 23, 2013

(54) LEARNING AND UNLEARNING IN A NETWORK SWITCH

(75) Inventors: Zenon Kuc, San Jose, CA (US); Yan Yang, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 1056 days.

(21) Appl. No.: 11/384,883

(22) Filed: Mar. 20, 2006

(51) Int. Cl.
*H04L 12/28* (2006.01)
(52) U.S. Cl.
USPC .......................... 370/401; 370/402; 370/428
(58) Field of Classification Search .................. 370/252, 370/402, 428, 401; 707/102
See application file for complete search history.

(56) References Cited

U.S. PATENT DOCUMENTS

| | | | | |
|---|---|---|---|---|
| 6,119,167 | A * | 9/2000 | Boyle et al. | 709/234 |
| 6,772,223 | B1 * | 8/2004 | Corl et al. | 709/238 |
| 6,842,457 | B1 * | 1/2005 | Malalur | 370/428 |
| 7,562,213 | B1 * | 7/2009 | Timms | 713/160 |
| 2003/0152035 | A1 * | 8/2003 | Pettit et al. | 370/252 |
| 2004/0267802 | A1 * | 12/2004 | Grondalski | 707/102 |
| 2005/0267928 | A1 * | 12/2005 | Anderson et al. | 709/200 |

\* cited by examiner

*Primary Examiner* — Dang Ton
*Assistant Examiner* — Pamit Kaur
(74) *Attorney, Agent, or Firm* — Anderson Gorecki & Rouille LLP

(57) ABSTRACT

A modified Ethernet packet includes a MAC address unlearn flag. A port receiving the packet unlearns the specified MAC address, i.e., removes the corresponding entry from its forwarding table. Unlearn packets may be generated by a switch CPU in response to detection of a port failure in order to remove entries associated with the failed port. The modified Ethernet packet may alternatively, or also, include an attribute learn field. An Ethernet switch is operable to learn the specified attribute in response to receipt of the packet. Attributes that may be specified include: copy-to-CPU; static; class-of-service; source-discard; destination-discard; and L3. The copy-to-CPU attribute is operable to prompt copying of subsequent packets observed with the same SA to the CPU. The static attribute is operable to prompt prevention of a specified MAC address from being removed from a forwarding table due to aging. The class-of-service attribute is operable to prompt override of a packet class-of-service value with a specified value for subsequent packets of a specified MAC address. The source-discard attribute is operable to prompt discard of subsequent packets having a specified SA. The destination-discard attribute is operable to prompt discard of subsequent packets having a specified DA. The L3 attribute is operable to prompt packets destined for a specified MAC address to be routed rather than switched.

19 Claims, 5 Drawing Sheets

Learn/Unlearn Packet 500

LEARNING AND UNLEARNING IN A NETWORK SWITCH

FIELD OF THE INVENTION

This invention relates generally to the field of network communications, and more particularly to faster unlearning of addresses and faster learning of special attributes in a switch.

BACKGROUND OF THE INVENTION

Ethernet was originally developed at the Xerox Palo Alto Research Center ("PARC"), and subsequently standardized by the Institute of Electrical and Electronic Engineers ("IEEE") as the 802.3 standard. As Ethernet grew in popularity and network technology advanced, new IEEE standards were adopted for faster version of Ethernet, e.g., 10 Mbps, then 100 Mbps. Currently, IEEE 802.3z defines the 1000Base-X standard for 1 Gbps Ethernet, also known as "Gigabit Ethernet." One problem that can arise as line rates increase, whether in equipment that supports Ethernet traffic or any other network protocol, is that configuration and maintenance functions which are implemented in software become relatively slow. While this is not necessarily debilitating to the equipment, it can degrade performance and cause somewhat unpredictable operation.

SUMMARY OF THE INVENTION

In accordance with one embodiment of the invention, a method for configuring a network device which is operable to receive a protocol data unit on a first port and forward that protocol data unit to at least one other port, comprising the steps of: setting an indicator in a device configuration field of a protocol data unit, thereby creating a protocol configuration data unit; forwarding the protocol configuration data unit to at least one port of the network device; receiving the protocol configuration data unit at the at least one port of the network device; and in response to receiving the protocol configuration data unit, reconfiguring the network device as indicated in the device configuration field.

In accordance with another embodiment of the invention, apparatus operable in a network to receive a protocol data unit on a first port and forward that protocol data unit to at least one other port, comprises: at least one processor operable in response to an indicator being set in a device configuration field of a protocol configuration data unit to reconfigure the network device as indicated in the device configuration field.

DETAILED DESCRIPTION

Figure 1:
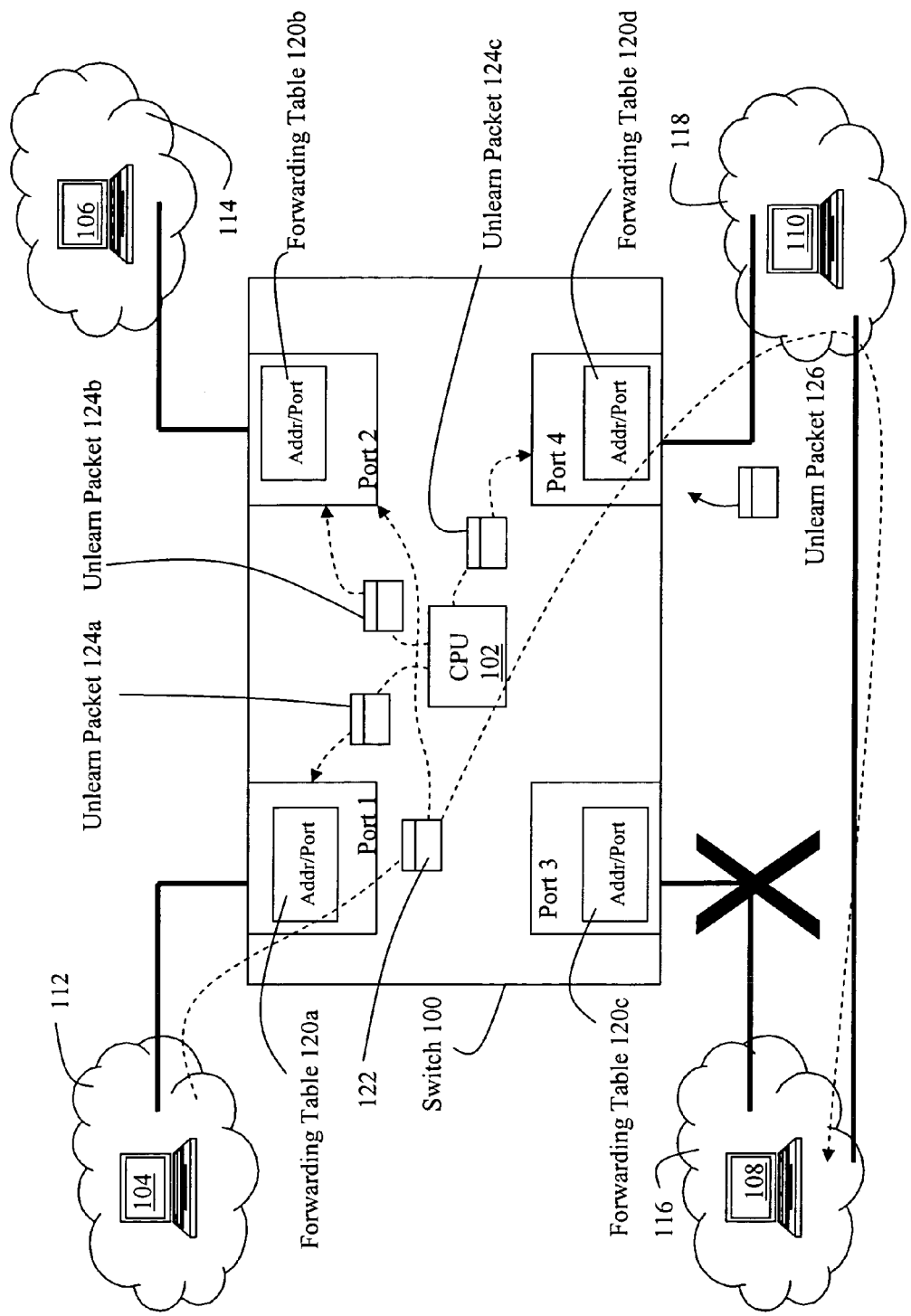
FIG. 1 is a block diagram of an Ethernet switch employing unlearn packets in response to a port failure.

FIG. 1 illustrates an Ethernet switch (100) configured to support line-rate MAC address unlearning. The switch has four ports (Port 1, Port 2, Port 3, Port 4), and a Central Processing Unit ("CPU") (102) which coordinates the ports. Each port includes an individual port chip and a physical interface to other devices (104, 106, 108, 110) on different network segments (112, 114, 116, 118). Each port also includes a forwarding table (120a, 120b, 120c, 120d) with MAC address/port bindings indicative of which devices are reachable on particular ports of the switch. The CPU (102) may maintain a master table by which the port forwarding tables (120a, 120b, 120c, 120d) are synchronized.

A primary function of the switch (100) is to forward packets from one network segment to another. When a packet is received by the switch, the receiving port searches for an entry in its forwarding table for a matching Destination Address ("DA"). If a matching entry is found and the indicated port is not the receiving port then the receiving port forwards the packet to the port indicated in the matching table entry. If a matching entry is found and the indicated port is the receiving port then the packet is discarded. If a matching entry is not found then the receiving port forwards the packet to all other ports of the switch, i.e., the packet is flooded. The packet should then reach its intended destination, the port of which may be learned upon receipt of a reply packet.

In order to facilitate forwarding of packets the switch learns where devices are in the network, e.g., which devices are on each network segment. The switch learns this information by observing the headers of incoming packets. For example, when the switch receives a packet (122) on Port 1, and the packet has a Source Address ("SA") of device (104) that is not in the table (120a), then the switch records that the SA is associated with Port 1 in forwarding table (120a). The information can get into forwarding tables 120b, 120c and 120d as follows: a) if the packet is flooded so that is goes to Ports 2, 3 and 4, that is when the information is added to forwarding tables 120b, 120c and 120d; b) if the packet goes only to Port 2, for example, that information is added only to forwarding table 120b. The information is not automatically added to forwarding tables 120c and 120d, except through software on the CPU (102).

Each forwarding table is maintained, at least in-part, by the port with which the table is associated. Since the size of the tables is finite and forwarding information can become inaccurate, the port is operable to age-out old table entries. In particular, the port observes how recently each entry was utilized, and removes entries that have not been utilized for at least some time threshold, e.g., X minutes. In view of the operational framework described above, it will be appreciated that there is some benefit in synchronizing the tables.

Figure 2:
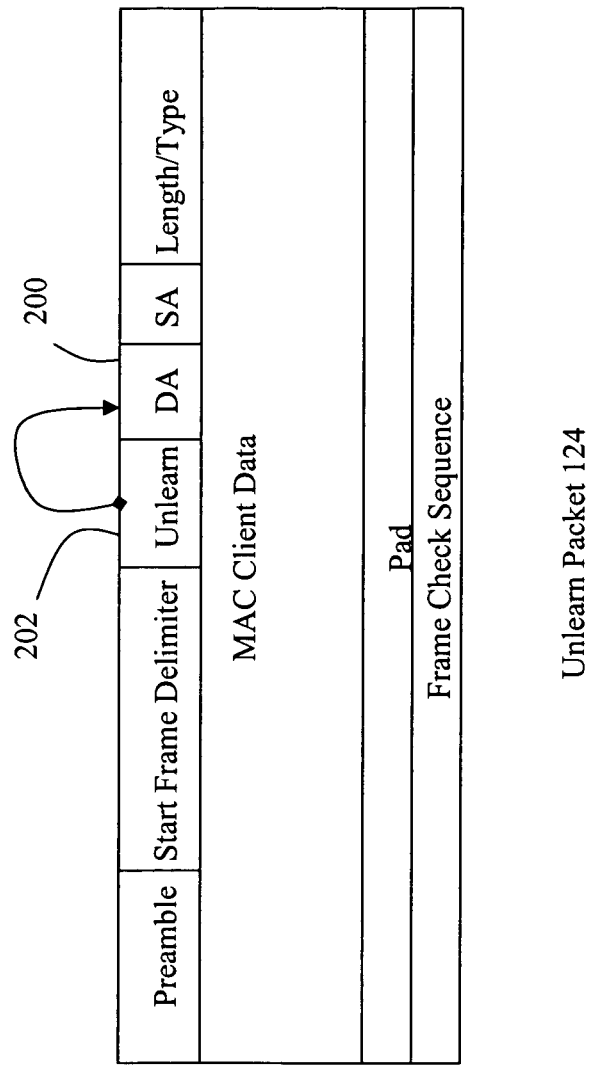
FIG. 2 illustrates an Ethernet MAC address unlearn packet.

Referring now to FIGS. 1 and 2, the CPU (102) is operable to facilitate maintenance of the forwarding tables (120a, 120b, 120c, 120d) by selectively prompting unlearning of particular entries. Unlearning can be triggered, for example, in response to port failure or link failure (illustrated with a large "X"). In the specifically illustrated example the forwarding tables of all four ports include an entry indicating that device (108) is on Port 3 at time T0. Port 3 subsequently fails at time T1. Because the forwarding table (120a) of Port 1 still indicates that device (108) is on Port 3 at time T1, a packet (122) received at Port 1 destined for device (108) will be forwarded to Port 3 until the entry binding device (108) with Port 3 is removed from the Port 1 table (120a). This is problematic because packets forwarded to Port 3 are likely to be lost or discarded following the failure. Further, device (108) may be reachable via at least one of the other ports, e.g., Port 4. The CPU (102) therefore forwards unlearn packets (124a, 124b, 124c) to the operational ports (Port 1, Port 2, Port4) in response to detection of the failure of Port 3. The operational ports are operable in response to the unlearn packets to remove the indicated entry from their respective address forwarding tables. Once the entry has been removed, the next received packet (122) that would otherwise have been forwarded to the failed port (Port 3) will be flooded to the all ports because there will not be a matching entry in the Port 1 table (120a). As a result, in the specifically illustrated example the packet from device (104) can reach device (108) via Port 4.

The unlearn packet (124) may have a format compatible with standard Ethernet packets. In the illustrated embodiment the unlearn packet includes a preamble, a start frame delimiter, a DA field (200), a SA field, a length/type field, an unlearn field (202), a MAC client data payload, a pad, and a frame check sequence. The unlearn field may be as short as 1 bit. When the unlearn bit is set, e.g., to logic 1, the receiving port examines the DA field and searches for a corresponding entry in its forwarding table. If a match is found, the entry is immediately removed from the forwarding table. Although the unlearn field (202) is illustrated between the start frame delimiter and the DA field, the unlearn field may be implemented elsewhere.

Benefits of line-rate MAC address unlearning include reducing the period of time that a single MAC address table contains an undesired MAC address. Further, the technique reduces the period of time that multiple MAC address tables contain an undesired MAC address. Further, the technique reduces the period of time that multiple MAC address tables are unsynchronized. It should be noted that an unlearning packet (124) might also be used between devices in the network.

Figure 3:
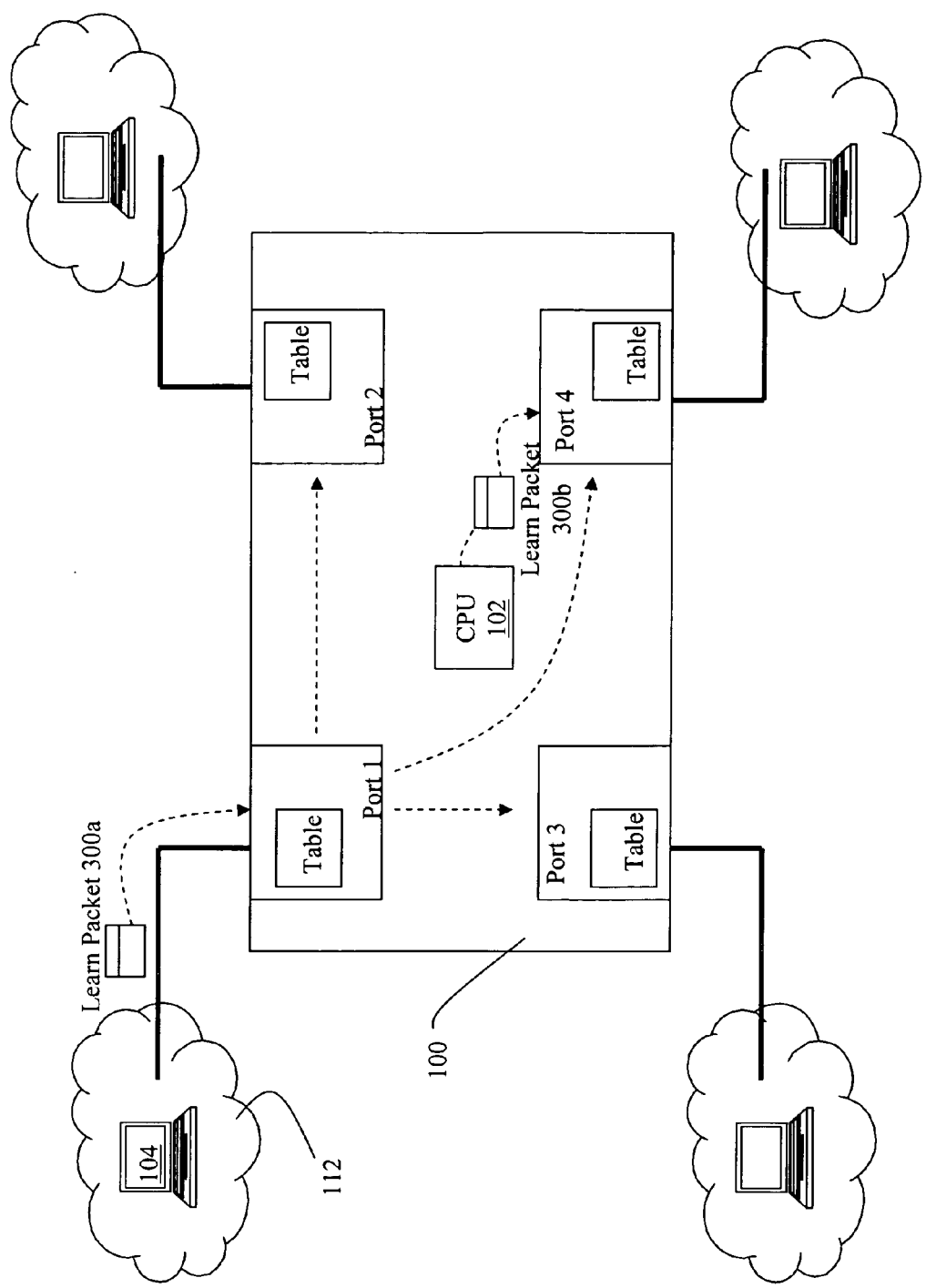
FIG. 3 is a block diagram of an Ethernet switch configured to process learn packets.
Figure 4:
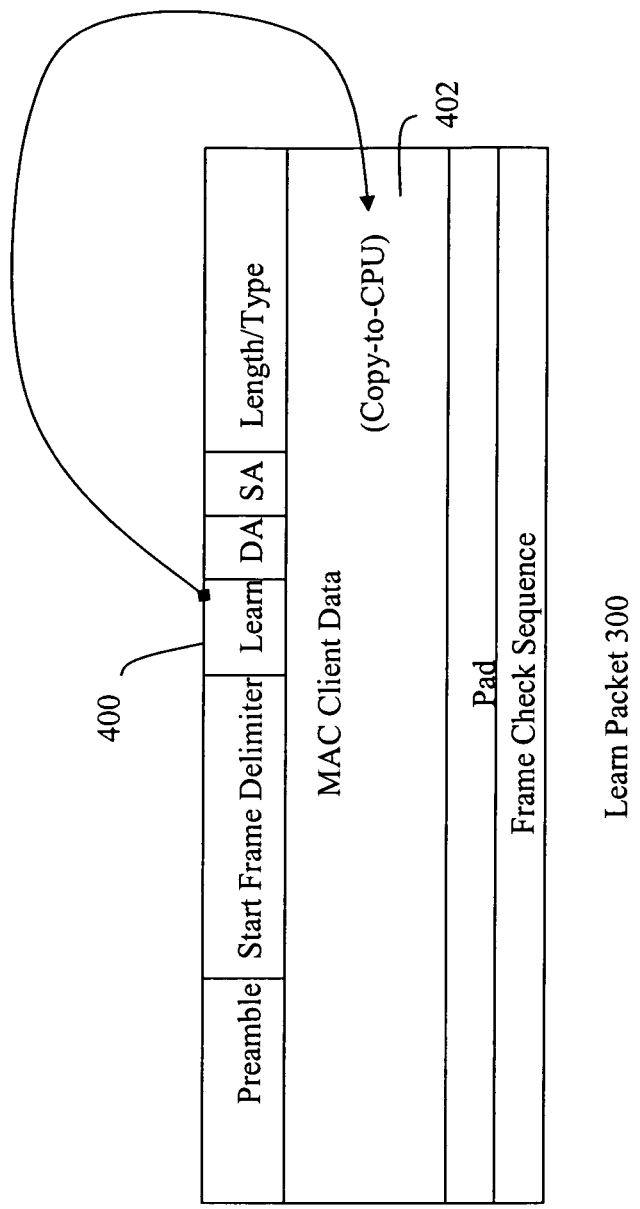
FIG. 4 illustrates an Ethernet learn packet.

Referring now to FIGS. 3 and 4, a learn packet (300) may be employed for triggering expedited learning of special attributes. In the illustrated embodiment the learn packet includes a preamble, a start frame delimiter, a DA field, a SA field, a length/type field, a learn field (400), a MAC client data payload (402), a pad, and a frame check sequence. The learn field may be as short as 1 bit. When the learn bit is set, e.g., to logic 1, the receiving port examines the MAC client data payload for an indicator of which attribute to learn. Examples of MAC address attributes that could be learned along with the source MAC address include: copy-to-CPU; static; class-of-service; source-discard; destination-discard; and L3. The copy-to-CPU attribute is operable to prompt copying of subsequent packets observed with the same SA to the CPU. The static attribute is operable to prompt prevention of a specified MAC address from being removed from a forwarding table due to aging. The class-of-service attribute is operable to prompt override of a packet class-of-service value with a specified value for subsequent packets of a specified MAC address. The source-discard attribute is operable to prompt discard of subsequent packets having a specified SA. The destination-discard attribute is operable to prompt discard of subsequent packets having a specified DA. The L3 attribute is operable to prompt packets destined for a specified MAC address to be routed rather than switched.

The learn field may alternatively be a mask, a multi-bit encoded field, or dedicated to a particular attribute. The multi-bit encoded learn field could specify both that an attribute is to be learned and which attribute is to be learned. Alternatively, the learn field mask could simultaneously prompt learning of multiple attributes. Although the learn field (400) is illustrated between the start frame delimiter and the DA field, the unlearn field may be implemented elsewhere.

It should be noted that a learn packet may be generated and used entirely within a switch, or between switches. For example, learn packet (300a) could be generated by device (104) in network segment (112) and transmitted to switch (100), whereby device (104) teaches switch (100). Alternatively, learn packet (300b) could be generated by CPU (102) for transmission to Port 4 to cause Port 4 to learn an attribute.

Benefits of line-rate MAC address learning with special attributes include reducing the period of time that a single MAC address table contains a MAC address with incorrect special attributes. Further, the technique reduces the period of time that multiple MAC address tables contain a MAC address with incorrect special attributes. Further, the technique reduces the period of time that multiple MAC address tables are unsynchronized.

Figure 5:
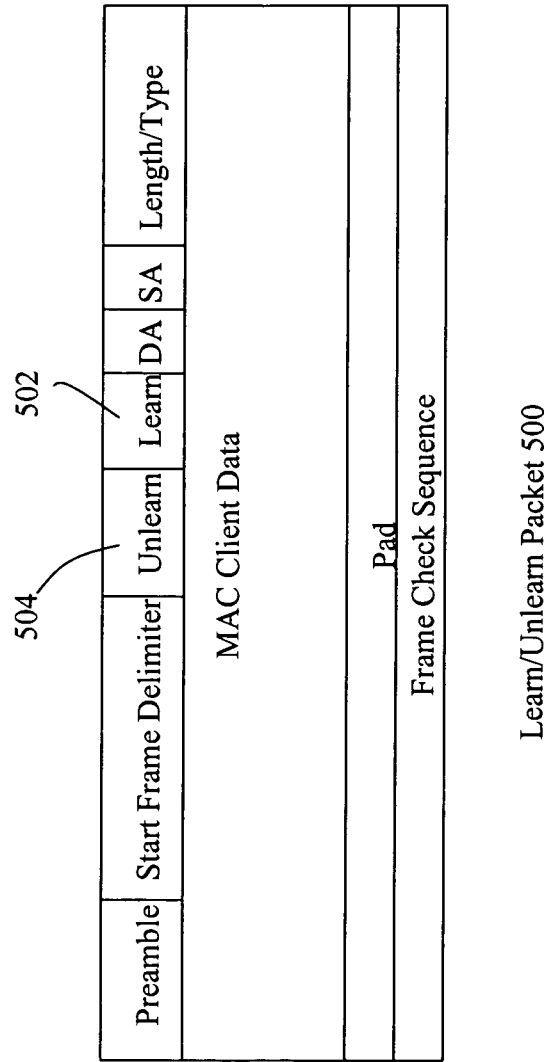
FIG. 5 illustrates an Ethernet learn/unlearn packet.

Referring now to FIG. 5, a learn/unlearn packet (500) includes both a learn field (502) and an unlearn field (504). Individually, the learn and unlearn fields (502, 504) could be processed as already described above with regard to fields (202) and (400). However, it will be appreciated that this packet (500) could simultaneously prompt both learning and unlearning operations. In another embodiment the unlearning operation could be implemented as one of the attributes of the learn packet. It should also be noted that learn packets may be generated by the CPU for the benefit of ports or other network devices. Similarly, unlearn packets may be received from other network devices. In some circumstances it may even be desirable to forward unlearn packets between devices, e.g., in a modular switch architecture. Although the learn and unlearn fields are illustrated between the start frame delimiter and the DA field, they may be implemented elsewhere.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for configuring a network device which receives a protocol data unit on a first port and forward that protocol data unit to at least one other port, comprising the steps of:
    setting an indicator of a change in processing of data units associated with a specified address in a device configuration field of a protocol data unit, thereby creating a protocol configuration data unit, wherein the protocol configuration data unit includes an address field with an address, and the device configuration field includes an unlearn field;
    forwarding the protocol configuration data unit to at least one port of the network device;
    receiving the protocol configuration data unit at the at least one port of the network device;
    in response to receiving the protocol configuration data unit with the indicator, reconfiguring the network device as indicated in the device configuration field, including removing an entry having the same address as the address in the address field from a forwarding table;
    receiving a subsequent packet associated with the specified address at the reconfigured network device; and
    processing the subsequent packet at the reconfigured network device in accordance with the reconfiguration indicated in the device configuration field of the protocol configuration data unit.

2. The method of claim 1 wherein the network device includes a central processing unit ("CPU"), and including the further steps of detecting a port failure and forwarding, by the CPU, a copy of the protocol configuration data unit to each unfailed port.

3. The method of claim 2 comprising the further step of forwarding, by the CPU, at least one protocol configuration data unit to each unfailed port for each address associated with the failed port.

4. The method of claim 1 wherein the device configuration field includes a learn field, and including the further step of learning an attribute specified by the protocol configuration data unit in response to an indicator in the learn field.

5. The method of claim 4 further comprising the step of learning to copy subsequent protocol data units observed with the same source address to the CPU.

6. The method of claim 4 further comprising the step of learning to prevent a specified address from being removed from a forwarding table due to aging.

7. The method of claim 4 further comprising the step of learning to override a class-of-service value with a specified value for subsequent protocol data units of a specified address.

8. The method of claim 4 further comprising the step of learning to discard subsequent protocol data units having a specified source address.

9. The method of claim 4 further comprising the step of learning to discard of subsequent protocol data units having a specified destination address.

10. The method of claim 4 further comprising the step of learning to prompt protocol data units destined for a specified address to be routed rather than switched.

11. Apparatus, in a network, which receives a protocol data unit on a first port and forward that protocol data unit to at least one other port, comprising:
at least one processor which functions in response to an indicator of a change in processing of data units associated with a specified address being set in a device configuration field which includes an unlearn field of a protocol configuration data unit which includes an address field with an address to reconfigure the network device as indicated in the device configuration field, including removing an entry having the same address as the address in the address field from a forwarding table, and upon receiving a subsequent packet associated with the specified address processing the subsequent packet in accordance with the reconfiguration indicated in the device configuration field of the protocol configuration data unit.

12. The apparatus of claim 11 further including a central processing unit ("CPU") which detects a port failure, and in response to detecting the port failure to forward a copy of the protocol configuration data unit to each unfailed port.

13. The apparatus of claim 12 wherein the CPU forwards at least one protocol configuration data unit to each unfailed port for each address associated with the failed port.

14. The apparatus of claim 11 wherein the device configuration field includes a learn field, and further comprising circuitry which learns to copy subsequent protocol data units observed with the same source address to the CPU.

15. The apparatus of claim 11 wherein the device configuration field includes a learn field, and further comprising circuitry which learns to prevent a specified address from being removed from a forwarding table due to aging.

16. The apparatus of claim 11 wherein the device configuration field includes a learn field, and further comprising circuitry which learns to override a class-of-service value with a specified value for subsequent protocol data units of a specified address.

17. The apparatus of claim 11 wherein the device configuration field includes a learn field, and further comprising circuitry which learns to discard subsequent protocol data units having a specified source address.

18. The apparatus of claim 11 wherein the device configuration field includes a learn field, and further comprising circuitry which learns to discard of subsequent protocol data units having a specified destination address.

19. The apparatus of claim 11 wherein the device configuration field includes a learn field, and further comprising circuitry which learns to prompt protocol data units destined for a specified address to be routed rather than switched.

* * * * *